Figure 3:
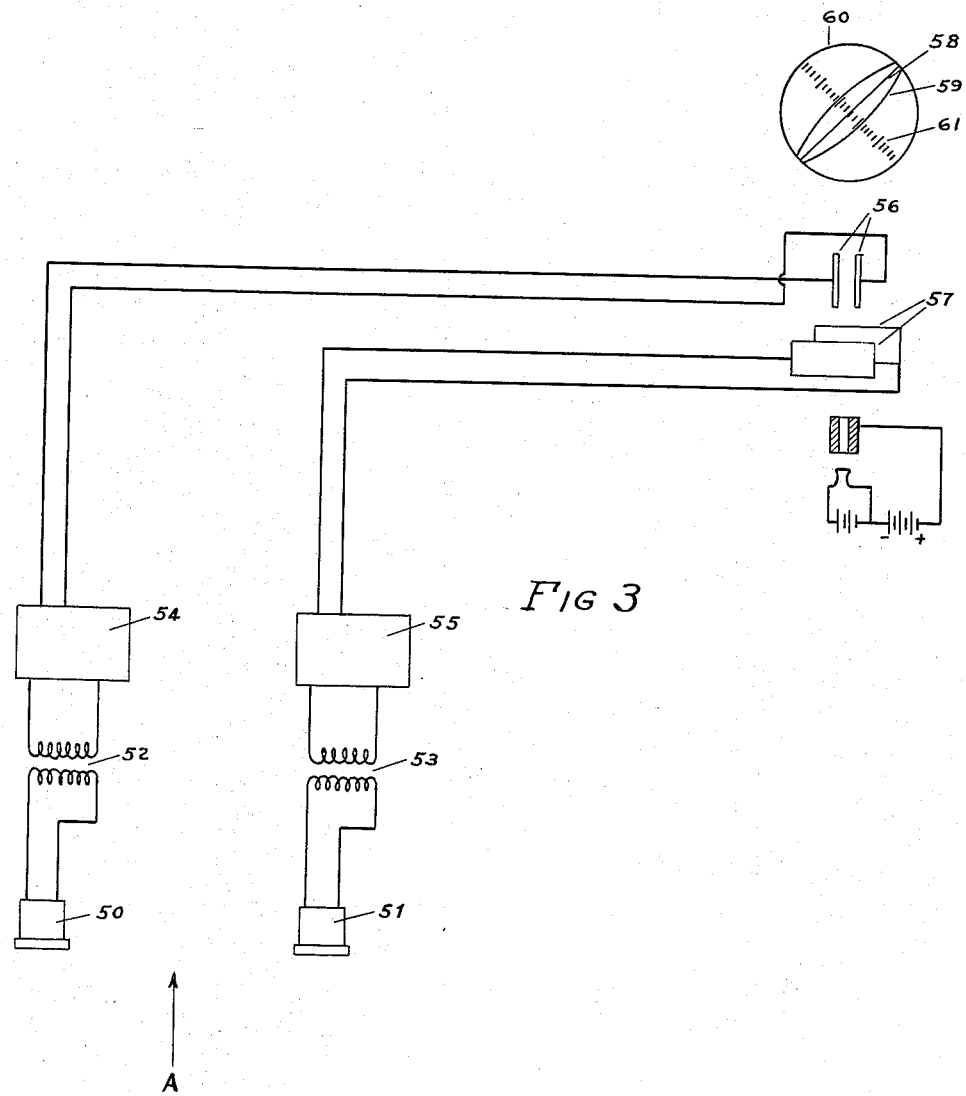

Dec. 4, 1934.  E. E. TURNER, JR  1,983,254
METHOD AND APPARATUS FOR DISTANCE FINDING
Filed May 19, 1930  2 Sheets-Sheet 1
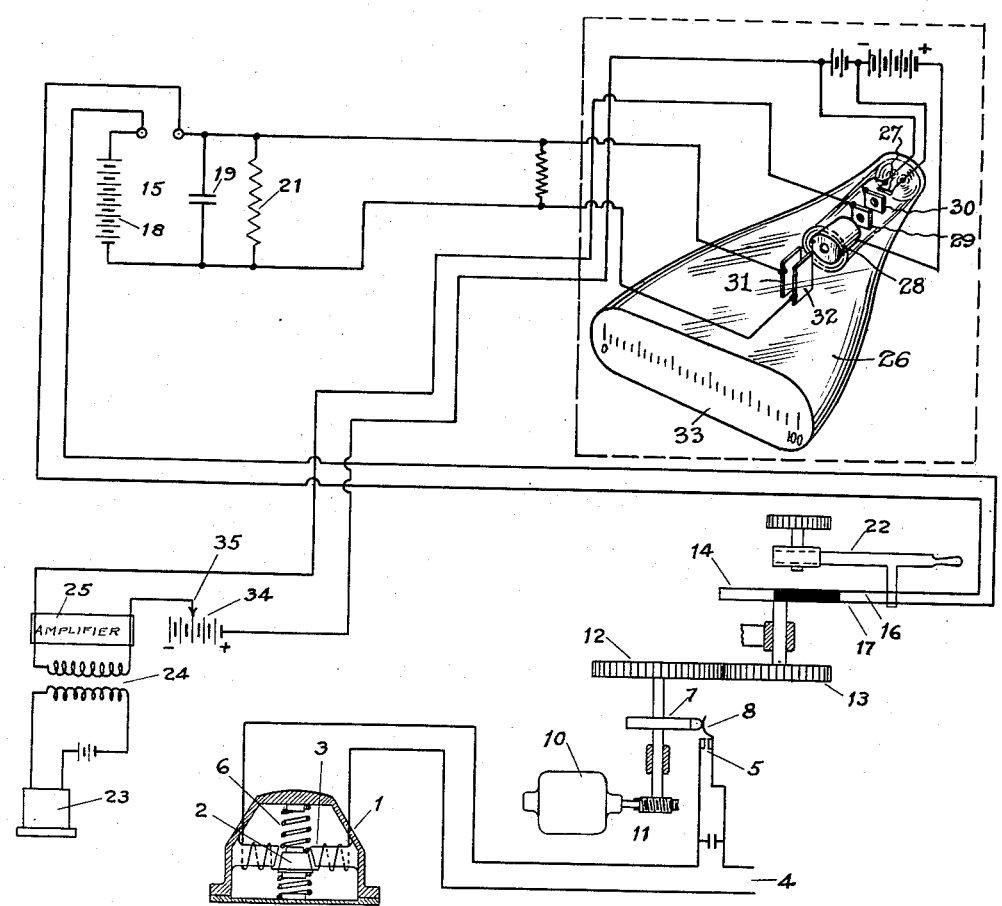
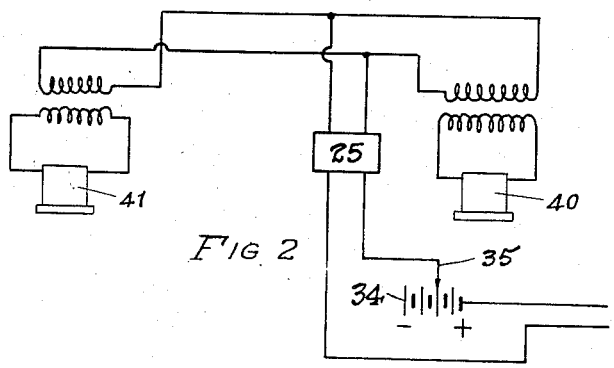
Fig 1
Fig 2
INVENTOR
Edwin E. Turner Jr.
BY Ezekiel Wolf
ATTORNEY Dec. 4, 1934.   E. E. TURNER, JR   1,983,254
METHOD AND APPARATUS FOR DISTANCE FINDING
Filed May 19, 1930   2 Sheets-Sheet 2

INVENTOR
Edwin E. Turner Jr
By
Ezekiel Wolf
ATTORNEY

Patented Dec. 4, 1934

1,983,254

UNITED STATES PATENT OFFICE 1,983,254

METHOD AND APPARATUS FOR DISTANCE FINDING

Edwin E. Turner, Jr., West Roxbury, Mass., assignor to Submarine Signal Company, Boston, Mass., a corporation of Maine Application May 19, 1930, Serial No. 453,732

5 Claims. (Cl. 177—386)

The present invention relates to a method and apparatus for measuring distances, such as heights or depths, by means of reflected compression waves. More particularly the present invention concerns measuring the height of an aircraft or the depth of water beneath a vessel in which a compression wave is transmitted and the time interval between the emission of the compression wave and the receipt of the reflected echo from the object or surface whose distance is desired, is measured.

In the present invention the measurement is made by the use of a cathode ray tube, otherwise known as the Braun tube, in which a control grid is used to produce an instantaneous indication simultaneous with the receipt of the reflected wave. The present system is characterized by the lack of rotating mechanism in the indicating device itself, the whole time measuring system being controlled by electrical phenomena in which there are no moving parts present.

The present system may also be employed in measuring a short time interval between the reception of two compressional signals whether one is the reflected impulse of the other or some other signal having a definite time relation with the first signal.

Various successful means have been employed in the determination of heights and depths by the use of the so-called time of travel principle of compressional waves. The present system finds its particular usefulness over the prior art in its ability to give an accurate measurement simply and in a direct manner.

Further advantages gained through the present invention will be better understood from a consideration of the following description taken in connection with the drawings illustrating an embodiment of the invention in which Fig. 1 shows schematically the invention; Fig. 2 shows a detail of a modification of the invention; and Fig. 3 shows a further modification.

In Fig. 1 the compressional wave may be produced by a so-called impact oscillator 1 which may be mounted in the skin of a vessel, in a tank in the vessel or in any other suitable position in a depth sounding installation. In finding heights of an aircraft by compression wave means the compressional wave producer may be a directive supersonic beam of sound which may be periodically emitted in accordance with the system described in connection with Fig. 1. Under some conditions in determining heights of an aircraft the sound of the motor may be used or other sound producers, such as an explosive bomb or other such suitable means. In the impact striker shown in Fig. 1 the impact hammer 2 is drawn up by the magnet 3 energized through the electrical supply 4 when the contacts 5 are closed. The hammer 2 is drawn up against the force of the spring 6 and remains in that position until the contacts 5 are opened by the cam 7 pushing outward the contact arm 8. When this occurs the hammer 2 is released and causes a compressional wave to be emitted from the diaphragm 9.

The production of the compressional wave impulse is controlled periodically by the motor 10 driving through the worm reduction gear 11, the cam 7 and the spur gear 12. The spur gear 12 meshes with a spur gear 13 driving the commutator 14 which is conductive in one half and insulating in the other half. The commutator 14 controls the timing circuit 15 and during the time when the conductive part of the commutator 14 connects the brushes 16 and 17, the battery 18 is allowed to charge the condenser 19 across its terminals. When the insulating part of the commutator 14 comes beneath the brushes 16 and 17, the circuit to the battery 18 is opened and the condenser begins to discharge through the resistance 21. The brushes 16 and 17 may be adjusted by the adjustable brush arm 22 so that the circuit 15 is opened at the moment of the emission of the compressional wave.

The compressional wave from the impact oscillator 1 may travel to the bottom of the ocean and when reflected be received by the receiver 23 which may be a microphone or magnetophone or, in the case of supersonic signaling, the condenser receiver of the usual type. The impulse received by the receiver 23 may be transmitted by means of a transformer 24 to an amplifier 25 which operates the cathode ray indicator 26. The cathode ray indicator consists of a highly evacuated tube having a cathode 27, a hollow anode 28 and a control grid 29 placed between the cathode and the anode. The cathode may be shielded by a shield 30.

The indicator is also provided with plates 31 and 32 and a scale 33. Ordinarily if there is no voltage on the control grid and the proper voltage is supplied to the anode an electron stream will be produced which will show as a spot on the scale 33 which might be luminescent if desired. When, however, the control grid 29 is biased by a negative potential 34 by means of the adjustable tap 35, this beam may be suppressed so that no indication is visible on the scale 33.

The cathode ray indicator has an outer glass container and an inner container within the end of the outer container. The inner container has everything but the control plates 31 and 32. This expedient is used so that the entire electron stream must flow through the hollow anode 28 and so that the beam may be preserved.

The receiving system is so operated that the incoming reflected wave overcomes sufficiently the grid bias 34 so that an indication may be produced on the scale 33.

The position of this indication is controlled by the potential on the control plates 31 and 32 through the timing circuit 15. When the condenser 19 has completely discharged, the beam is not deflected by the plates and in this position produces the full scale reading. At the beginning of the operation when the condenser 19 is fully charged, the plates 30 and 31 will deflect the beam the greatest amount to the beginning of the scale marked zero. The plates 30 and 31 assume a varying potential corresponding to the potential across the condenser which is a time function of the rate of discharge of the condenser and resistance 21. The scale 33 may be calibrated for this time function so that it will indicate directly the distances which are being measured.

When the brushes 16 and 17 pass from the insulating segment of the commutator 14 to the conducting segment, the circuit through the battery 15 is closed and the condenser 19 is allowed to charge. This occurs during half of a revolution of the commutator 14 and allows the condenser 19 to become fully charged before the circuit is opened in synchronism with the production of the sound wave. The commutator 14 thus provides sufficient time for the condenser 19 to become charged before the sound is produced.

In Fig. 2 a system is shown in which the receivers 40 and 41 may successively receive an indication from the same sound source. In this case both receivers 40 and 41 may cause an indication on the scale 33 indicating the difference of the time of arrival of the sound at each receiver. Knowing the velocity of the sound wave and the distance apart of the receivers, the scale may be properly calibrated in the desired units of distance or direction. The receivers 40 and 41 may act in parallel either aiding or opposing upon the amplifier 25 and thereby on the indicator 26 similarly as in Fig. 1.

In place of using an impact device for determination of direction, a continuous oscillatory compressional wave may be used in connection with a cathode ray indicator having four control plates arranged in pairs perpendicular to each other. In this connection each pair will be controlled individually by each receiver, the phase difference between the plates producing an elliptical figure which may be used to indicate the angular direction of the source of sound. This system is shown in Fig. 3 in which the receivers 50 and 51 are individually connected through transformers 52 and 53, respectively, to the amplifiers 54 and 55 which control the sinusoidal potential on the plates 56 and 57.

When the sound wave is approaching normally to the receivers 50 and 51, as indicated by the arrow A, the beam of the cathode ray tube will show as a straight line as indicated by 58 on the indicator 60. When the sound approaches from a direction other than the normal the straight line 58 is replaced by an ellipse 59, the width of which on the scale 61 will depend upon the phase displacement between the two waves received by the different receivers and therefore upon the direction of the source of sound.

This system may be usefully employed in determining directions of sources of sound such as that produced by an oscillator on a vessel. Such a system is useful particularly in avoiding collisions at sea in times of foggy weather since it gives the direct visual indication of the direction of the sound source and is not dependent upon aural listening and compensation which is particularly objectionable to navigating officers at such times.

Having now described my invention, I claim:

1. A system for determining depths and distances by means of compressional waves, comprising means for emitting compressional wave impulses, means for receiving said impulses after reflection from the object whose distance is to be measured and means for measuring the time interval between the emission of the impulse and the receipt of the reflected impulse including means for producing an electron beam at the instant of receiving the reflected impulse and means for controlling the position of the beam as a time function of the interval, and a scale to indicate the distance positioned in the path of the beam in its various positions and material on the scale which becomes luminous where it comes in contact with the beam.

2. A system for determining depths and distances by means of compressional waves comprising means for emitting compressional wave impulses, means for receiving said impulses after reflection from the object whose distance is to be measured and means for indicating the receipt of said impulses and measuring the time interval between their emission and reception including a cathode ray tube having means for creating an electron beam, means for suppressing the beam and means for controlling the position of the beam including a plurality of control plates and means for applying a given potential on the plates at the instant that the sound is emitted and varying uniformly in the same direction in a definitely selected time relation to the time interval from the emission of the sound, means connecting said receiving means to said beam suppressing means and means operable by the receiving means to remove the effect of the suppressing means to produce a beam and a scale associated therewith to indicate the depth.

3. In a system for depth and distance measurement, a sound receiving and indicating system comprising a plurality of microphones to receive the sound wave, an amplifier having its input connected to said microphones, a cathode ray tube adapted to produce an electron beam having a control grid and control plates, means operatively connecting the output of the amplifier with said control grid, means providing a potential on said grid for normally suppressing said beam except upon the receipt of said sound waves, means impressing a progressively varying potential varying in a mode corresponding to the distance traversed by the sound between said control plates establishing progressively different positions of said beam corresponding to the time interval between the reception of the sound waves on the receivers and means for making the beam visible.

4. In a system for depth and distance measurement, a sound receiving and indicating system comprising a plurality of microphones to receive the sound wave, a cathode ray tube adapted to produce an electron beam having a control grid and control plates, means operatively connecting the receivers to the control grid, means providing a potential on said grid for normally suppressing said beam except upon the receipt of said sound waves, means impressing a progressively varying potential varying in a mode corresponding to the distance traversed by the sound between said control plates for establishing the time interval between the reception of the sound waves on the receivers and means for making the beam visible.

5. A system for determining depths or distances by means of compressional waves, comprising means for emitting compressional wave impulses, means for receiving said impulses after reflection from the object whose distance is to be measured, and means for measuring and indicating the time interval in distances between the emission and reception of the compressional waves including a cathode ray tube having means for creating an electron beam, a scale calibrated in distances associated with said tube, means for causing the beam to sweep across the scale at a rate corresponding to the distances measured on the scale from the emission of the compressional wave signal, means normally suppressing said beam except upon receipt of the reflected signal, and means operable by the receipt of the reflected signal for removing said suppressing means.

EDWIN E. TURNER, Jr.